No. 732,914. PATENTED JULY 7, 1903.
G. ATHERTON.
BRAKE FOR ELECTRIC OR OTHER TRAM CARS OR VEHICLES.
APPLICATION FILED FEB. 2, 1903.
NO MODEL. 2 SHEETS—SHEET 1.

WITNESSES. INVENTOR.
Giles Atherton.
By his Attorneys

No. 732,914. PATENTED JULY 7, 1903.
G. ATHERTON.
BRAKE FOR ELECTRIC OR OTHER TRAM CARS OR VEHICLES.
APPLICATION FILED FEB. 2, 1903.
NO MODEL. 2 SHEETS—SHEET 2.
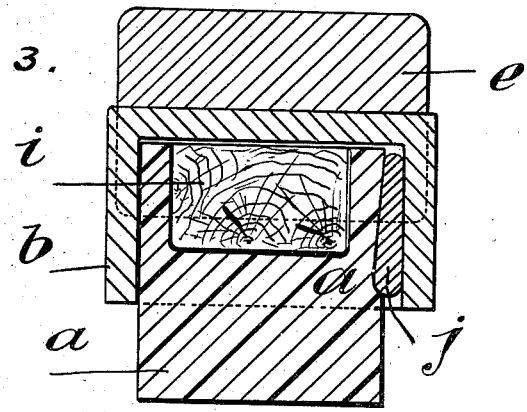
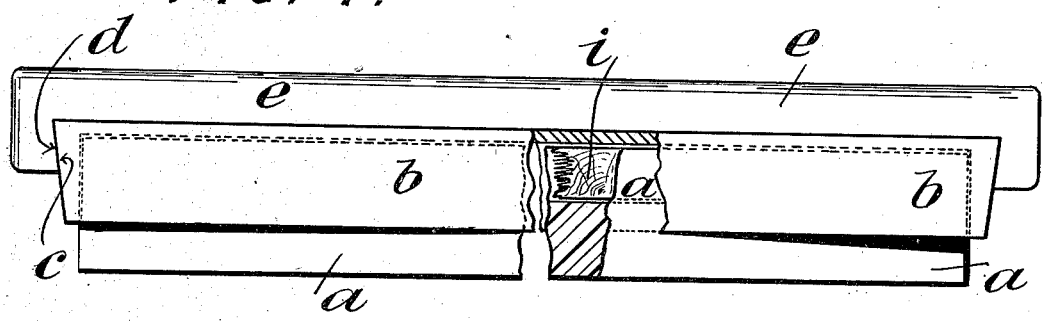
WITNESSES. INVENTOR.
H. M. Kuehnel Giles Atherton.
J. M. Dowling By his Attorneys Richards No. 732,914.

Patented July 7, 1903.

UNITED STATES PATENT OFFICE.

GILES ATHERTON, OF STOCKPORT, ENGLAND.

BRAKE FOR ELECTRIC OR OTHER TRAM-CARS OR VEHICLES.

SPECIFICATION forming part of Letters Patent No. 732,914, dated July 7, 1903.

Application filed February 2, 1903. Serial No. 141,498. (No model.)

*To all whom it may concern:*

Be it known that I, GILES ATHERTON, hatters' engineer, a subject of the King of Great Britain and Ireland, residing at Virginia Mills, Higher Hillgate, Stockport, in the county of Chester, England, have invented certain new and useful Improvements in or Connected with the Brakes of Electric or other Tram-Cars or Vehicles, (for which I have made application for a patent in Great Britain, No. 14,901, dated July 4, 1902,) of which the following is a specification.

This invention has reference more particularly to the brakes of electric and other tram cars. In such electric cars it is customary to employ slipper-brakes acting upon the rails of the permanent way as emergency-brakes or used as brakes additional to the brakes acting on the wheels of the vehicle. Such slipper-brakes are provided with a braking-surface of wood, which I find is not a particularly good material for the purpose, as it is liable to set up considerable noise and jolting when applied to reduce the speed or stop the car.
In the first place my invention relates to the application of a material as a braking-surface which will not only afford a better contact or frictional surface than wood, but which will retard the speed or stop the car more efficiently and with less noise and jolting. For this purpose I employ a rubber composition consisting of forty-five parts of rubber, forty-five parts of textile fiber, (preferably vegetable,) and ten parts of sulfur, although these proportions may be slightly varied without affecting the peculiar properties of the composition to any great extent. I have found by experiment that this rubber composition possesses particularly efficient qualities as a friction-brake and is very noiseless and smooth in action.

Figure 1:
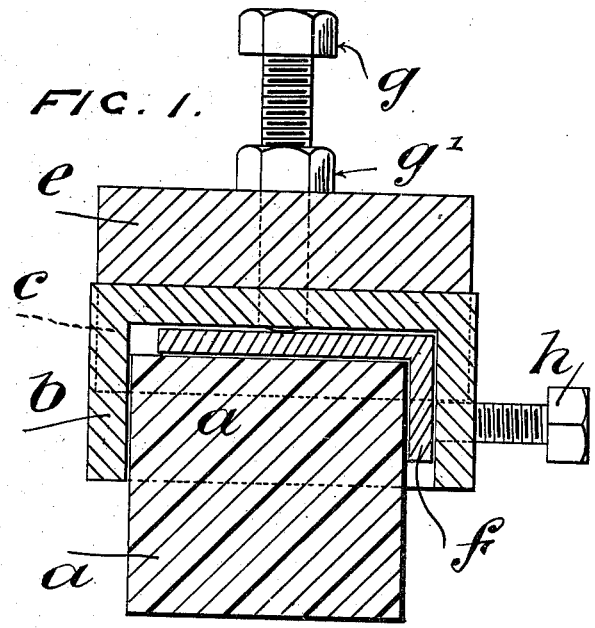
Figure 2:
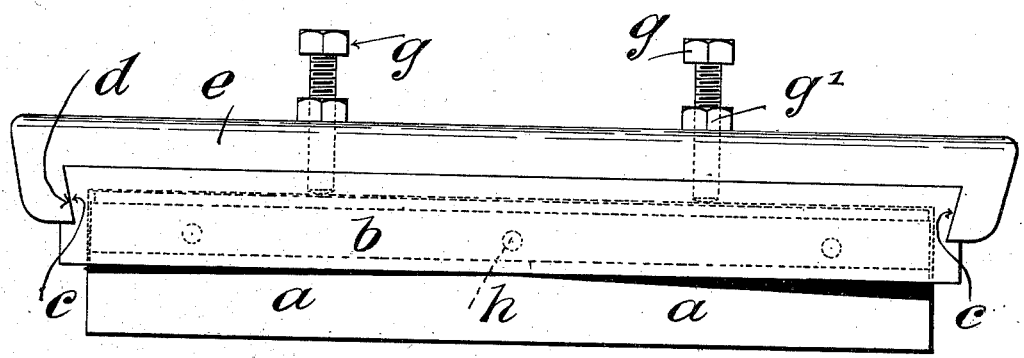

My invention relates also to means for compensating for wear of the rubber brake block or shoe, so that it need not be discarded when the thickness of the shoe is only worn away to a slight extent, as is the case at present, and further to an improved means for readily securing the friction-shoe to the permanent block.
Figure 1 of the drawings attached hereto shows in cross-section a brake-block made from the rubber composition above described and the means for compensating for wear of the brake-block and also the means for securing the rubber friction block or shoe to the permanent block. Fig. 2 is a side elevation of Fig. 1, but on a scale of half-size. Fig. 3 shows in cross-section a modification of the rubber-composition brake-shoe and the means for securing it to the permanent brake-block. Fig. 4 is a side view of the same, partly in section, on a smaller scale.

I mount the rubber-composition brake-shoe $a$ in a metallic trough-shaped holder $b$ with dovetailed or inclined ends $c$, designed to engage with corresponding dovetails $d$, formed in the permanent brake-block $e$. The metallic holder $b$, carrying the brake-shoe $a$, is thus easily slid into engagement from the side with the permanent block $e$, as will be seen from an inspection of Fig. 2, and is securely held thereby without the necessity of retaining-bolts and can be fixed by an unskilled person. The means I adopt to compensate for wear of the brake-shoe $a$ are as follows:

The brake-shoe $a$ is backed up within the metallic holder $b$ by a stout angle-plate of metal $f$, upon the top of which bear two or more set-screws $g$. These set-screws pass through the permanent brake-block $e$ and are screwed into the metallic holder $b$ of the brake-shoe $a$. By operating the set-screws the backing-plate $f$ and the brake-shoe $a$ are thrust out of the holder to the required degree to take up the wear. Lock-nuts $g'$ are provided to prevent the accidental rotation of the screwed studs. To secure the rubber-composition brake-shoe $a$ to the holder $b$, set-screws $h$, screwed into the side, bear upon the side web of the angle-plate $f$ and serve to jam the whole within the holder $b$.

To reduce the cost of the rubber-composition brake-shoe $a$, the interior may be hollowed out and be filled in with a core of wood $i$ or the like material, as shown in Figs. 3 and 4. In such a case there would be no necessity to provide adjusting means for wear and the rubber brake-shoe $a$ could be secured to the metallic holder $b$ by a simple wedge $j$.
The brake-surface of rubber composition may also be used in conjunction with the brake-blocks acting upon the wheels of the tram-car or other vehicle. This would avoid wear of the wheel-tires to an appreciable extent and lengthen the life of the wheels.

I declare that what I claim is—

1. A brake shoe or block as a contact braking-surface for the permanent way of tramway systems, or the wheels of tram-cars and other vehicles, consisting of rubber composition of forty-five parts of rubber, forty-five parts of textile fiber and ten parts of sulfur or thereabout substantially as described.

2. In combination the rubber-composition brake-shoe $a$ having a core of wood $i$, the holder $b$ and brake-block $e$ means for mounting or securing the holder $b$ to the brake-block $e$ and a wedge $j$ to secure the rubber-composition brake-shoe $a$ within the holder $b$ substantially as described.

In witness whereof I have hereunto set my hand in presence of two witnesses.

GILES ATHERTON.

Witnesses:
JOSHUA ENTWISLE,
ALFRED YATES.